US012754051B2

(12) United States Patent
Christensen et al.

(10) Patent No.: US 12,754,051 B2
(45) Date of Patent: Oct. 6, 2026

(54) COMPACT FLUID FLOW SENSOR

(71) Applicant: Advanced Energy Industries, Inc., Denver, CO (US)

(72) Inventors: Weston Christensen, Fort Collins, CO (US); Jon Danielson, Fort Collins, CO (US)

(73) Assignee: Advanced Energy Industries, Inc., Denver, CO (US)

( * ) Notice: Subject to any disclaimer, the term of this patent is extended or adjusted under 35 U.S.C. 154(b) by 196 days.

(21) Appl. No.: 18/103,269

(22) Filed: Jan. 30, 2023

(65) Prior Publication Data

US 2024/0255332 A1 Aug. 1, 2024

(51) Int. Cl.
*G01F 1/684* (2006.01)
*G01F 1/688* (2006.01)

(52) U.S. Cl.
CPC ............ *G01F 1/6847* (2013.01); *G01F 1/688* (2013.01)

(58) Field of Classification Search
CPC ............................................... G01F 1/684–688
See application file for complete search history.

(56) References Cited

U.S. PATENT DOCUMENTS 3,366,942 A * 1/1968 Deane ..................... G01F 1/696 73/204.11
6,085,588 A * 7/2000 Khadkikar .............. G01F 1/684 73/204.25
6,871,535 B2 * 3/2005 Blakley ..................... G01F 1/72 73/204.22
6,981,410 B2 * 1/2006 Seki ........................ G01F 1/692 73/204.26
7,895,888 B2 * 3/2011 Hasebe ................. G01F 1/6847 73/204.27
10,401,206 B2 9/2019 Gaberthuel
11,300,432 B1 * 4/2022 Yang ....................... G01F 1/684
11,761,915 B2 * 9/2023 Wetzel ................... G01N 25/20 73/198
2013/0037112 A1 2/2013 Smirnov
2021/0310840 A1 * 10/2021 Feagler ................. G01F 1/6847

FOREIGN PATENT DOCUMENTS

CN 211178608 U * 8/2020
WO 1997030333 A9 10/1997

OTHER PUBLICATIONS

PCT, International Search Report and Written Opinion issued in PCT/US24/13569, May 15, 2024, 18 pages, Published in: US.

* cited by examiner

*Primary Examiner* — Justin N Olamit
(74) *Attorney, Agent, or Firm* — NOD Law PC

(57) ABSTRACT

Systems and methods are described for monitoring fluid flow through a conduit. A method comprises conveying a fluid in a conduit so that the fluid impinges upon an impingement within the conduit and sensing a temperature with a heated temperature sensor that is thermally coupled to the conduit to provide a heated temperature measurement. The method also includes heating the heated temperature sensor with a heater and sensing a temperature of the fluid at a location of the conduit that is thermally isolated from the heater to obtain a reference temperature measurement. An indication of a flowrate of the fluid is provided based on a temperature difference between the reference temperature measurement and the heated temperature measurement.

15 Claims, 13 Drawing Sheets

COMPACT FLUID FLOW SENSOR

BACKGROUND

Field

The present disclosure relates generally to sensing technologies, and more specifically, to fluid flow sensing technologies.

Background

The sensing of the flow of fluids is an important technology. Sensing the fluid flow often requires devices that are bulky and/or must be immersed within the fluid flow path. Common sensing techniques include mechanical displacement, pressure changes, fluid level changes, optical sensors, and sonar techniques, among others. These techniques require that the sensor be immersed in the fluid flow path. There are many issues with these techniques such as contamination of the fluid, poor reliability due to the moving parts, high cost, and opportunities for leak paths where the sensor is inserted into the conduit, among others. Therefore, there is a need for cost efficient, highly reliable, non-invasive methods of measuring fluid flow.

SUMMARY

According to an aspect, a system for monitoring a fluid flow is disclosed. The system comprises a conduit for conveying a fluid in a fluid flow direction, wherein the conduit comprises an impingement to the fluid flow. A reference temperature sensor is configured to sense a temperature of the fluid and provide a reference temperature measurement and a heated temperature sensor is thermally coupled to the conduit in close proximity to the impingement to provide a heated temperature measurement. A heater is affixed to the conduit in thermal proximity to the heated temperature sensor to enable the heater to heat the heated temperature sensor and a flow monitor is configured to provide an indication of a flowrate of the fluid based on a temperature difference between the reference temperature measurement and the heated temperature measurement.

According to another aspect, a method comprises monitoring a fluid flow, and the method comprises conveying a fluid in a conduit so that the fluid impinges upon an impingement within the conduit. The method also includes sensing a temperature with a heated temperature sensor that is thermally coupled to the conduit in close proximity to the impingement to provide a heated temperature measurement. The heated temperature sensor is heated with a heater and a temperature of the fluid is sensed at a location of the conduit that is thermally isolated from the heater to obtain a reference temperature measurement and providing an indication of a flowrate of the fluid based on a temperature difference between the reference temperature measurement and the heated temperature measurement.

DETAILED DESCRIPTION

Figure 1A:
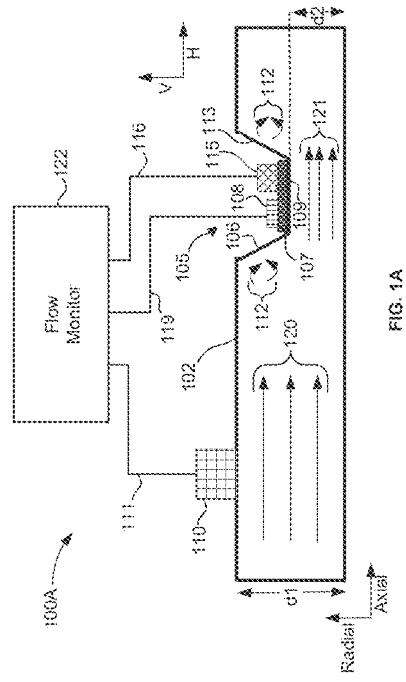
FIG. 1A is a block diagram depicting a system for monitoring a fluid flow.

The word "exemplary" is used herein to mean "serving as an example, instance, or illustration." Any embodiment described herein as "exemplary" is not necessarily to be construed as preferred or advantageous over other embodiments.

As used herein, reference numeral may refer to different variations of the same general construct. For example, the impingement 105 disclosed herein may have any of a variety of geometries. Unless limited in the claims, a particular reference numeral refers to the various implementations.

It is noted that, as used herein and in the claims, the singular forms "a," "an," and "the" include plural referents unless the context clearly dictates otherwise. Thus, for example, reference to "a layer" includes two or more layers, and so forth.

The term "horizontal" as used herein will be understood to be defined as an arbitrary reference direction, H. The term "vertical" will refer to a direction, V, perpendicular to the horizontal direction, H, as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

Figure 1B:
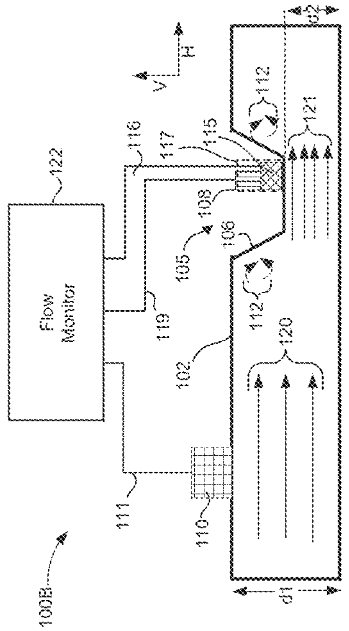
FIG. 1B is a block diagram depicting another system for monitoring a fluid flow.
Figure 1C:
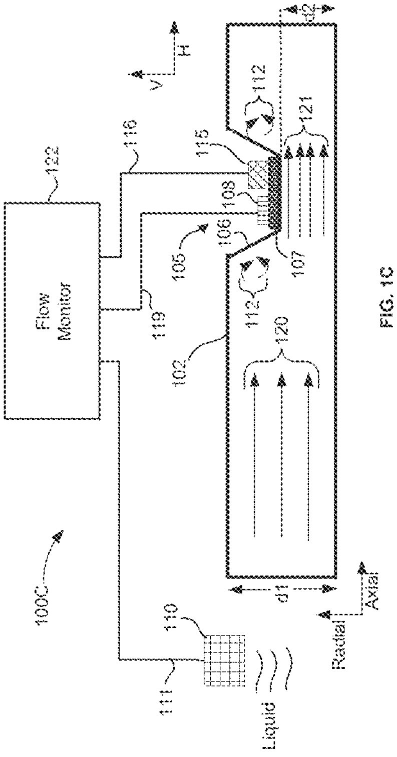
FIG. 1C is a block diagram depicting yet another system for monitoring a fluid flow.

Aspects disclosed herein include new systems and methods for measuring the flow of a fluid. FIGS. 1A, 1B, and 1C are bock diagrams depicting respective systems 100A, 100B, and 100C. As shown in FIGS. 1A, 1B, and 1C a conduit 102 is operable to convey a fluid (e.g., a liquid such as water) inside the conduit, and a reference temperature sensor 110 and a heated temperature sensor 115 are affixed outside of conduit 102. The fluid flow direction 120 in FIG. 1 is arbitrarily shown as a horizontal direction moving left to right. In FIGS. 1A-3C the impingement comprises a deformation in the conduit 102, and in FIG. 4, the deformation is formed by a change in direction of the conduit 102.

Beneficially the systems disclosed herein provide a non-invasive flow sensing approach based on a temperature differential between a reference temperature (at the reference temperature sensor 110) and a heated temperature (at the heated temperature sensor 115). Some examples of reference temperature sensor 110 and the heated temperature sensor 115 include thermistors, resistance temperature devices (RTDs), thermocouples, semiconductor type sensors, and infrared sensors among others. The choice of which technology to use is based on the application, where factors such as cost, space requirements, temperature range, performance and stability are considered. The data from temperature sensing can be valuable for someone operating a system or process to have fluid flow information about a target area. The data can show various indicators important to a system operator, designer, or technician.

There are many advantages to being able to monitor a fluid flow such as, for example, noticing faults and unexpected loss of fluid flow in a system. An example of applications that benefit from monitoring fluid flow is the cooling of power supplies used to supply power to manufacturing operations. These power supplies may be used to supply high power to equipment used in the manufacture of items such as semiconductor chips, light emitting diodes (LEDs), solar panels, and fluid crystal displays (LCDs), among others. A loss of cooling fluid to the power supply may result in damage to the power supply and subsequent loss of product. The advantages can be dependent upon any custom application and certain fluid flow sensing technologies can be restricted in use if the limitations are too great. For example, a sensor that is inserted into the fluid can measure precise fluid flow, but the technology is invasive, is expensive, and may not be practical for field use. Thus, there is a need to offer custom and economically viable fluid flow sensors adapted to a variety of different needs.

In operation, the heated temperature sensor 115 is heated with a heater 108 and heat will be removed from heated temperature sensor 115 by the flow of the fluid through conduit 102. A temperature difference between a reference temperature measurement 111 provided by the reference temperature sensor 110 and a heated temperature measurement 116 provided by the heated temperature sensor 115 will be inversely related to the flow rate of the fluid.

In system 100A, 100B, 100C, the deformation forming the impingement 105 may be realized by a variety of different geometries (i.e., the geometry of the impingement 105 may be different than the geometry depicted in FIGS. 1A, 1B, and 1C), but in general, the impingement 105 comprises a portion of the conduit 102 that is formed with a directional component that is perpendicular to the fluid flow direction 120. In the system 100A, 100B, 100C the conduit 102 is generally disposed with an axial component that is parallel with the horizontal direction so that a radial component of the conduit 102 is parallel with the vertical direction. As shown, the deformation of the impingement 105 comprises an upstream sidewall 106 that comprises a radial component and an axial component that forms a sloped shape and the radial component is perpendicular to the fluid flow 120. The impingement 105 also comprises a transition portion 109 and a downstream sidewall 113. As discussed further herein, each of the upstream sidewall 106, the transition portion 109, and the downstream sidewall 113 may have a different geometry and orientation than depicted in FIGS. 1A, 1B, and 1C. In contrast to prior systems, the impingement 105 enhances sensitivity and improves useful flow rate range. It is also noted that the depicted system 100A, 100B, 100C is able to measure a temperature difference without using electrically and mechanically complex components such as a Wheatstone bridge, capillary tubes, or bypass tubes, which are known to be used in gas-measuring mass flow sensors.

Although the heated temperature sensor 115 and the heater 108 are positioned above or on the transition portion 109 of the impingement 105, the heated temperature sensor 115 and the heater 108 may be positioned on different portions of the impingement 105. For example and without limitation, the heater 108 may be positioned on the upstream sidewall 106 and the heated temperature sensor 115 may be positioned on the transition portion 109 or vice versa.

In some embodiments, impingement 105 may be symmetric around an axis of conduit 102 (e.g., an annular deformation). In other embodiments, impingement 105 may not be symmetric around an axis of conduit 102 (e.g., there may be a deformation in a single portion of conduit 102). As an example of a non-symmetric case, impingement 105 is illustrated as being formed in the "top" of conduit 102. However, impingement 105 may also be formed in the "bottom" or "sides" of the conduit.

In system 100A, 100B, 100C, the heated temperature sensor 115 is affixed to conduit 102 within a depressed portion of the deformation of the impingement 105 where a diameter of the conduit 102 is a compressed diameter, d2, that is less than a general diameter, d1, of the conduit 102. In the system 100A, 100B, and 100C, the impingement 105 causes the flow of the fluid to be compressed and increases the turbulence and velocity of the flow in the region of the deformation as illustrated by arrows 112 and arrows 121 in the restricted region, respectively. The compression and turbulent flow of the fluid in thermal proximity to the heated temperature sensor 115 enhances the extraction of heat from the heated temperature sensor 115. This results in a greater sensitivity to flow rate of the measurement of heated temperature sensor 115, which allows for more precise estimation of flow based on the difference between reference temperature sensor 110 and heated temperature sensor 115. The increased variation to changing flow gives system 100A, 100B enhanced sensitivity and a larger useful flow rate range. This system configuration has shown response times to changes in fluid flow of less than 1 second.

The size of impingement 105 may be established to improve the sensitivity of the fluid flow measuring system. When the deformation is implemented as a depression in a surface of the conduit 102, the depth of impingement 105 is such that between 10% and 50% of the conduit cross sectional area is occluded. Advantageously, the depth of impingement 105 in the implementations of FIGS. 1A, 1B, and 1C occludes about 30% of the conduit cross sectional area. A length of deformation along the length of the conduit 102 can be between about 0.065 centimeters and about 2.5 centimeters, but the dimensions are not critical and other dimensions are certainly contemplated. Advantageously, the length of deformation along the length of the conduit is about 1.25 centimeters.

In many implementations (e.g., as shown in FIGS. 1A and 1C), the heater 108 is decoupled as a separate component from the heated temperature sensor 115. In these implementations, the heater 108 may heat the heated temperature sensor 115 through the substrate 107 via conduction. In these implementations, any noise in the power that is applied to the heater 108 is separated from the heated temperature sensor 115 so noise does not interfere with the heated temperature measurement 116. The heater 108 may be physically, and hence, thermally close to the heated temperature sensor 115. The spacing between the heater 108 and the heated temperature sensor 115 may be between about 0.13 centimeters and about 0.38 centimeters, but it is contemplated that these dimensions may be scaled depending upon a size of the conduit 102. In some implementations, the spacing is about 0.65 centimeters. When implemented as a separate heater, the heater 108 may be a resistance heater with a resistance of between about 1 ohm and about 80 ohms. But this value range is only an example, and the specific resistance that is utilized is dependent upon a voltage applied to the heater 108. In operation, power is supplied to heater 108 to generate heat, and the heat is conducted by conduit 102 (and the substrate 107 when the substrate is utilized) and the heat increases the temperature of heated temperature sensor 115. As the power supplied to heater 108 is increased, more heat is generated and the temperature of heated temperature sensor 115 is increased. In some implementations, the substrate 107 may be for example and without limitation, beryllium oxide or aluminum nitride.

FIG. 1B follows the same concept as FIGS. 1A and 1C except that the heater 108 is integrated with the heated temperature sensor 115 to form a heating-sensing device 117.

FIG. 1C is similar to the FIGS. 1A and 1B except that the reference temperature sensor 110 is not directly coupled to the conduit 102. Instead, the reference temperature sensor 110 is positioned to sense the temperature of the fluid in connection with another form of plumbing (e.g., supply tubing) that is not a part of the conduit 102. In some implementations the reference temperature sensor 110, may be applied in any location that can measure the temperature of the fluid.

Figure 2A:
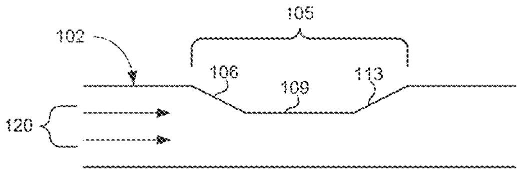
FIGS. 2A, 2B, 2C, and 2D each illustrate an example of non-symmetric deformation shapes according to some implementations.
Figure 2B:
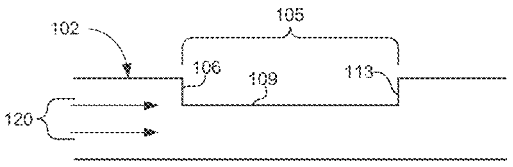
Figure 2C:
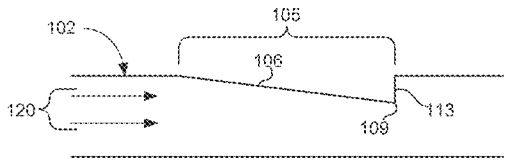
Figure 2D:
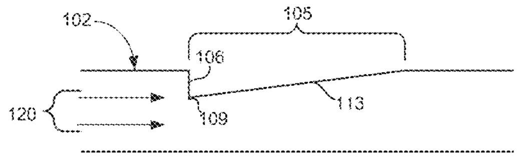

FIGS. 2A through 2D illustrate examples of non-symmetric deformation shapes according to some embodiments. In FIG. 2A, impingement 105 is illustrated as having a sloped upstream sidewall 106 and a sloped downstream sidewall 113 that encroach into fluid flow 120. In FIG. 2B, impingement 105 is illustrated as having both an upstream sidewall 106 and downstream sidewall 113 with an abrupt sidewall that encroach into fluid flow 120. In FIG. 2C, impingement 105 is illustrated as having an upstream sidewall 106 with a gradual slope that encroaches into fluid flow 120 and ends with a downstream sidewall 113 that begins with an abrupt transition 109 at a downstream edge of impingement 105. In FIG. 2D, impingement 105 is illustrated as having upstream sidewall 106 that is abrupt and perpendicular to the direction of fluid flow 120 and ends in a sloping downstream sidewall 113 at the downstream portion of impingement 105.

Figure 3A:
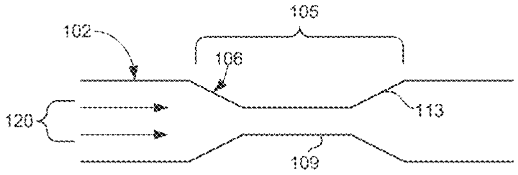
FIGS. 3A, 3B, 3C, and 3D each illustrate an example of symmetric deformation shapes according to some embodiments.
Figure 3B:
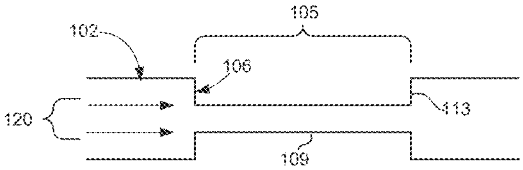
Figure 3C:
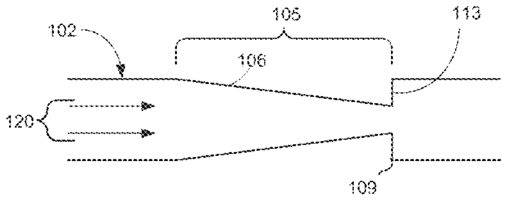
Figure 3D:
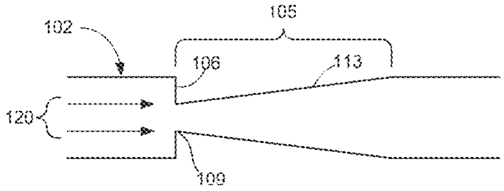

FIGS. 3A through 3D illustrate examples of impingement 105 formed by symmetric deformation shapes (e.g., an annular deformation) according to some variations. In FIG. 3A, impingement 105 is illustrated as having upstream sidewall 106 with a sloping shape that encroaches into fluid flow 120 with a radial component that causes the fluid flow 120 to impinge upon the deformation of the upstream sidewall 106 at about 45 degrees. In FIG. 3B, impingement 105 is illustrated as having upstream sidewall 106 with radial component that is perpendicular to a direction of the fluid flow 120. In FIG. 3C, impingement 105 is illustrated with upstream sidewall 106 comprising a gradual slope that encroaches into fluid flow 120 and downstream sidewall 113 is perpendicular to the fluid flow 120 at the downstream edge of impingement 105. In FIG. 3D, impingement 105 is illustrated as having upstream sidewall 106 that is perpendicular to the fluid flow 120 and impingement 105 ends with downstream sidewall 113 that has a gradual slope.

Figure 4:
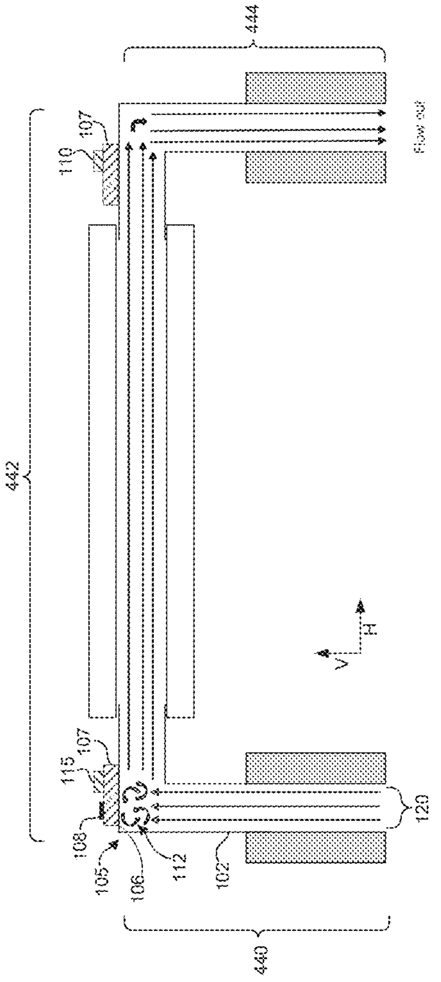
FIG. 4 depicts another example of a system for monitoring a fluid.

Referring next to FIG. 4, shown is another variation of the conduit 102 in which the conduit 102 is redirected in another direction to form the impingement 105. For example, the conduit may be redirected by 90 degrees, as shown in FIG. 4, to form the impingement 105. In the example depicted in FIG. 4, the conduit is U-shaped to form the impingement 105 with an upstream sidewall 106 that is perpendicular to a direction of the fluid flow 120. More specifically, the conduit 102 has an upstream vertical component 440, a horizontal component 442, and a downstream vertical component 446, and the upstream sidewall 106 is formed by a portion of the horizontal component 442 that is exposed to a vertical portion of the fluid flow 120 so that the fluid flow 120 directly impinges upon the upstream sidewall 106. As shown, the substrate 107 is positioned on an exterior portion of a wall of the conduit 102 that forms the upstream sidewall 106, and the heater 108 and heated temperature sensor 115 are positioned on top of the substrate 107. It is also noted that the transition portion 109 and downstream sidewall 113 (that are present in other implementations) are not discrete components of the impingement 105 of FIG. 4.

It should be recognized that positions of the heated temperature sensor 115 and the reference temperature sensor 110 may be switched so that the reference temperature sensor 110 is upstream of the heated temperature sensor 115. It should also be recognized that the substrate 107 is not required in the variation depicted in FIG. 4 (or other variations discussed herein), but the substrate 107 may provide a substantial increase in sensitivity, as discussed further herein. It should also be recognized that the conduit 102 may change direction more than or less than 90 degrees to form the impingement 105. For example, the conduit 102 in FIG. 4 may be modified to replace the horizontal section 442 with a triangular section to form the upstream sidewall 106 with components that are both parallel and perpendicular to the direction of the fluid flow 120. For clarity, the flow monitor 122 is not shown in FIG. 4, but the flow monitor 122 may be utilized in the same way as described in FIGS. 1B, 1C, and 1D. It should also be recognized that system described in FIG. 4 may be comprised of any number conduit components, not necessarily one contiguous piece as depicted in FIG. 4.

Figure 5:
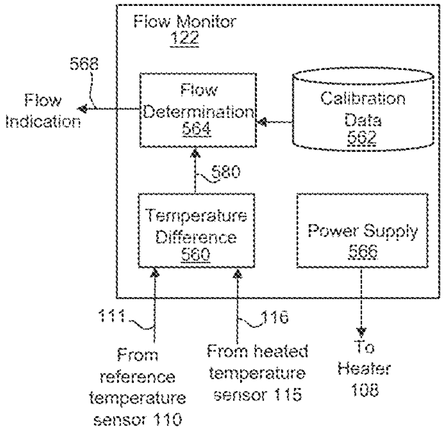
FIG. 5 is a block diagram depicting an example of a flow monitor that may be used in the systems described herein.
Figure 6:
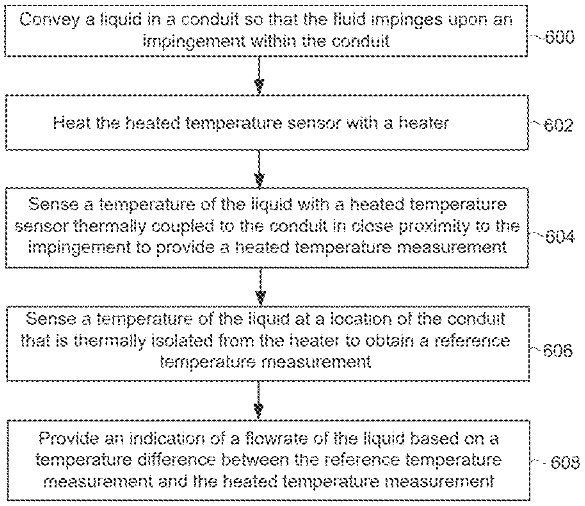
FIG. 6 is a flowchart depicting a method that may be traversed in connection with the systems disclosed herein.

Referring next to FIG. 5, shown is a block diagram depicting an embodiment of the flow monitor 122. As shown, the flow monitor 122 may comprise a temperature difference calculator 560, a calibration data datastore 562, and a determination module 564 that is coupled to both the temperature difference calculator 560 and the calibration data datastore 562. Also shown is a power supply 566 that is configured to apply power to the heater 108. The temperature difference calculator 560 and determination module 564 may be realized by hardware or hardware in connection with software, and the calibration data datastore 562 may be realized by memory such as non-volatile memory. And the power supply may be realized by a DC power supply that may be controlled by hardware or hardware in connection with software. While refereeing to FIG. 5, simultaneous reference is made to FIG. 6, which is a flowchart depicting a method that may be traversed in connection with operation of the flow monitor 122. It should be recognized that the method, and corresponding claims, are not limited by the order of activities presented in FIG. 6. In other words, the order the actions in FIG. 6 may vary without departing from the scope of the present claims.

As shown, a fluid is conveyed by the conduit 102 so that the fluid impinges upon the impingement 105 within the conduit 102 (Block 600), and the heated temperature sensor 115 is heated with the heater 108 (Block 602). A temperature of the fluid is sensed with the heated temperature sensor 115 that is thermally coupled to the conduit 102 in close proximity to the impingement 105 to provide the heated temperature measurement 116 (Block 604). As discussed, the heater 108 may be a resistance that is heated by applying a voltage to the resistance with the power supply 566 to cause a current to flow through the resistance, which causes heat. A temperature of the fluid is sensed with the reference temperature sensor 110 at a location that is thermally isolated from the heater 108 to obtain a reference temperature measurement 111 (Block 606). As discussed, the reference temperature sensor 110 may be positioned upstream or downstream of the heated temperature sensor 115 as long as the reference temperature sensor 110 is positioned to measure a temperature of the fluid without being measurably heated by the heater 108. One of ordinary skill in the art will readily appreciate how far the reference temperature sensor 110 must be positioned from the heater 108 to achieve thermal isolation so that the heat from the heater 108 does not adversely affect the reading of reference temperature sensor's 110 reading of the fluid temperature.

As shown, an indication of a flowrate of the fluid is provided based on a temperature difference between the reference temperature measurement 111 and the heated temperature measurement 116 (Block 608). More specifically, the temperature difference calculator 560 produces a temperature difference measure 580 that is indicative of the temperature difference between the reference temperature measurement 111 and the heated temperature measurement 116, and the determination module 564 accesses calibration data from the calibration datastore 562 that relates the temperature difference to a flowrate.

As one of ordinary skill in the art will appreciate, the calibration data may be created during a calibration mode by measuring the flow rate of fluid flow 120 with a precision flow rate instrument (which is very well known in the art) to obtain a flow rate value for each of a plurality of temperature difference values where each temperature difference value represents the difference between the reference temperature measurement 111 and the heated temperature measurement 116. More specifically, during calibration, the heater 108 may be heated with a specific power level and the flow rate of the fluid through the conduit may be varied to each of a plurality of different flow rates. For each flow rate, the precision flow rate instrument obtains a flow reading and a temperature difference between the reference temperature measurement 111 and the heated temperature measurement 116 is obtained.

In operation, the heater 108 is heated with the same power level that was used during calibration, and the temperature difference calculator 560 produces a temperature difference measure 580 that is indicative of the temperature difference between the reference temperature measurement 111 and the heated temperature measurement 116. The determination module 564 utilizes a value of the temperature difference measure 580 to access the calibration data from the calibration datastore 562 that relates a value of the temperature difference measure 580 to a stored flowrate value. The determination module 564 may utilize the flowrate value to provide a flow indication 568. The flow indication may be simply a flow value (e.g., in liters per minute), a visual indication indicative of flow rate (e.g., green for effective flow, yellow for marginally effective flow, and red for low flow), or an audible alarm when the flow rate drops below a particular flow threshold. It is also contemplated that the flow indication 568 may be used to automatically cut power to a device (e.g., a power supply) that is cooled by the fluid.

Figure 7:
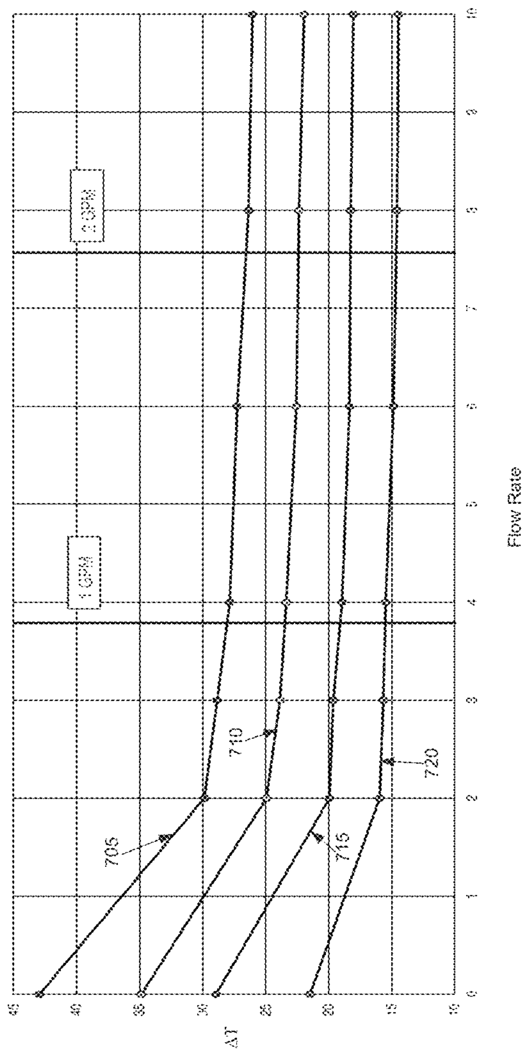
FIG. 7 presents data obtained using a system according to some embodiments.

Referring to FIG. 7, shown is an example of calibration data, depicted in graph form, that may be stored in the calibration data datastore 562. Shown in FIG. 7 is calibration data that depicts the effects of different power levels without the use of a substrate 107. Data were collected at fluid flow rates between 0 liters per minute (lpm) and 10 lpm at 4 different dissipation ranges (e.g., power levels) of the heater 108. Water at nominal room temperature was used as the fluid for the data illustrated in FIG. 7. The data set 705 corresponds to a dissipation level of 1,050 mW and fluid flows between 0 lpm and 10 lpm. The data set 710 corresponds to a dissipation level of 847 mW and fluid flows between 0 lpm and 10 lpm. The data set 715 corresponds to a dissipation level of 667 mW and fluid flows between 0 lpm and 10 lpm. The data set 720 corresponds to a dissipation level of 365 mW and fluid flows between 0 lpm and 10 lpm. The data presented in FIG. 7 indicates that the temperature difference between reference temperature sensor 110 and heated temperature sensor 115 is higher at higher dissipation levels.

Figure 8:
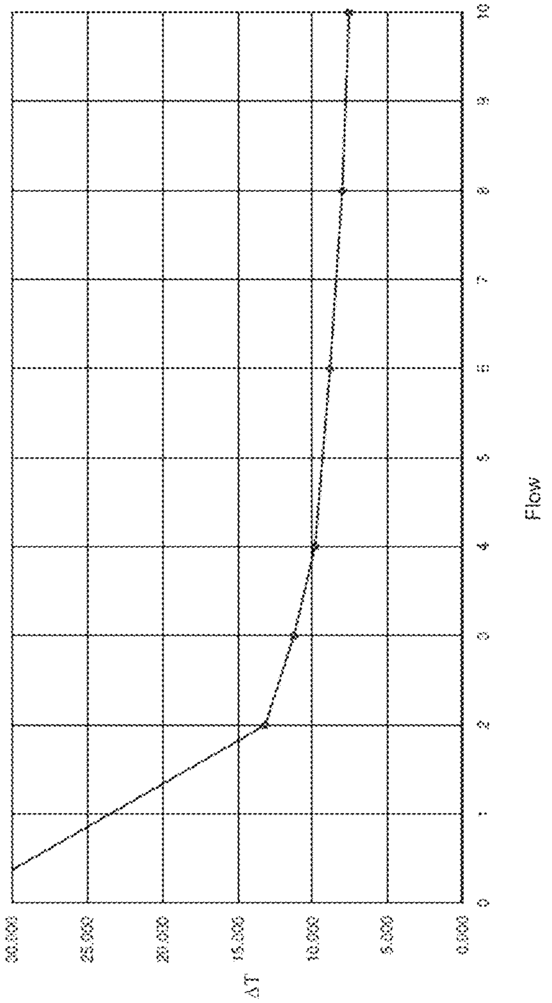
FIG. 8 presents additional data obtained using a system according to other embodiments.

Referring next to FIG. 8 shown is another example of calibration data that maps a plurality of temperature difference values to flow rates. In contrast to the calibration data in FIG. 7, the calibration data in FIG. 8 was generated when the substrate 107 (e.g., beryllium oxide) was utilized. The substrate 107 beneficially enables the heater 108 to heat the heated temperature sensor 115 more than if the heated temperature sensor 115 is directly coupled to the conduit 102 so that the heated temperature sensor 115 does not cool too quickly. The addition of the substrate 107 layer adds one more level of thermal resistance that permits more uniform heating of the area around the heated temperature sensor 115. In terms of performance, when the substrate 107 is utilized, there is a greater change in temperature difference values for changes in flow rate, and as a consequence, use of the substrate 107 produces a greater sensitivity, which enables a greater precision when measuring flow rates.

Figure 9:
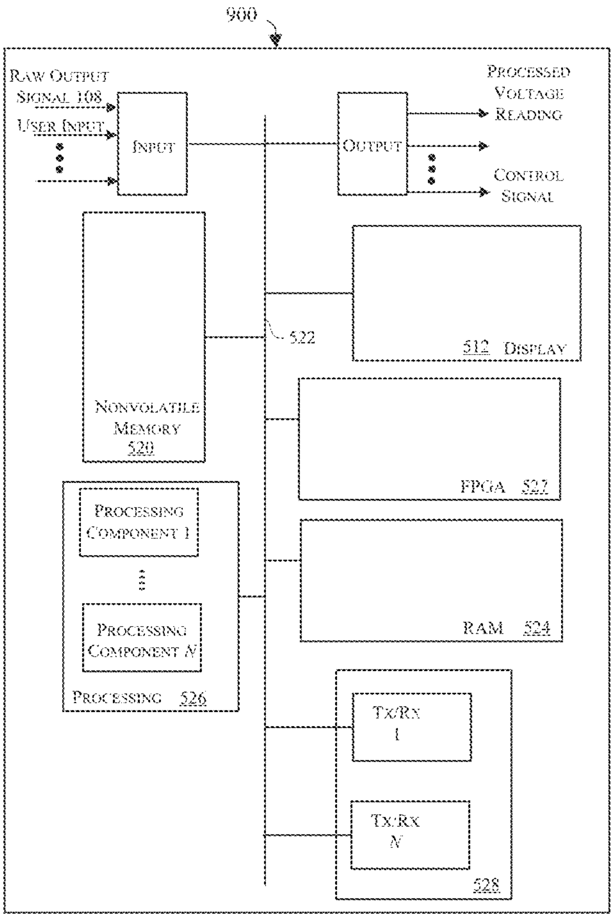
FIG. 9 is a block diagram depicting a computing system that may be used to realize some aspects disclosed herein.

The methods described in connection with the embodiments disclosed herein may be embodied directly in hardware, in processor executable instructions encoded in non-transitory machine-readable medium, or as a combination of the two. Referring to FIG. 9 for example, shown is a block diagram depicting physical components of an exemplary controller 900 that may be utilized to realize aspects of the flow monitor 122 according to an illustrative embodiment of this disclosure. As shown, in this embodiment a display 512 and nonvolatile memory 520 are coupled to a bus 522 that is also coupled to random access memory ("RAM") 524, a processing portion (which includes N processing components) 526, a field programmable gate array (FPGA) 527, and a transceiver component 528 that includes N transceivers. Although the components depicted in FIG. 5 represent physical components, FIG. 5 is not intended to be a detailed hardware diagram: thus, many of the components depicted in FIG. 5 may be realized by common constructs or distributed among additional physical components. Moreover, it is contemplated that other existing and yet-to-be developed physical components and architectures may be utilized to implement the functional components described with reference to FIG. 5.

The display 512 generally operates to provide a user interface for a user, and in several implementations, the display 512 is realized by a touchscreen display. For example, display 512 can be used to control and interact with the flow monitor 122. For example, the display 512 may display the flow indication 568, which may be parameter value(s) such as temperature or indicia of fluid flow. In general, the nonvolatile memory 520 is non-transitory memory that functions to store (e.g., persistently store) data and machine readable (e.g., processor executable) code (including executable code that is associated with effectuating the methods described herein). In some embodiments, for example, the nonvolatile memory 520 includes bootloader code, operating system code, file system code, and non-transitory processor-executable code to facilitate the execution of the methods described herein including the method described with reference to FIG. 6.

In many implementations, the nonvolatile memory 520 is realized by flash memory (e.g., NAND or ONENAND memory), but it is contemplated that other memory types may also be utilized. Although it may be possible to execute the code from the nonvolatile memory 520, the executable code in the nonvolatile memory is typically loaded into RAM 524 and executed by one or more of the N processing components in the processing portion 526. And the nonvolatile memory 520 may be used to realize the calibration data datastore 562 that stores the calibration data described with reference to FIGS. 8 and 9.

In operation, the N processing components in connection with RAM 524 may generally operate to execute the instructions stored in nonvolatile memory 520 to realize aspects of the temperature difference calculator 560 and determination module 564. For example, non-transitory processor-executable instructions to effectuate the methods described herein may be persistently stored in nonvolatile memory 520 and executed by the N processing components in connection with RAM 524. As one of ordinary skill in the art will appreciate, the processing portion 526 may include a video processor, digital signal processor (DSP), graphics processing unit (GPU), and other processing components.

In addition, or in the alternative, the field programmable gate array (FPGA) 527 may be configured to effectuate one or more aspects of the methodologies described herein. For example, non-transitory FPGA-configuration-instructions may be persistently stored in nonvolatile memory 520 and accessed by the FPGA 527 (e.g., during boot up) to configure the FPGA 527 to effectuate the functions of the controller 114.

In general, the input component functions to receive analog and/or digital signals such as, for example, the reference temperature measurement 111 and heated temperature measurement 116. The input component may also receive user input to control (e.g., a power level) the power supply 566. It should be recognized that the input component may be realized by several separate analog and/or digital input processing chains, but for simplicity, the input component is depicted as a single functional block. In an exemplary mode of operation, the input component may operate to receive the output signal from reference temperature sensor 110 and heated temperature sensor 115, and processor-executable instructions (effectuating the temperature difference calculator 560 and the determination module 564) prompt calibration data in nonvolatile memory 520 to be accessed to obtain parameter values that represent, for example, temperature. The output component may be used to provide the flow indication 568 in the form of one or more analog or digital signals.

It is also contemplated that the output component may provide a control signal to control (e.g., as a feedback signal) the environmental parameter that is being monitored. For example, the control signal may be coupled to a system used for fault detection under conditions of reduced fluid flow or loss of fluid flow.

The depicted transceiver component 528 includes N transceiver chains, which may be used for communicating with external devices via wireless or wireline networks. Each of the N transceiver chains may represent a transceiver associated with a particular communication scheme (e.g., WiFi, ethernet, universal serial bus, profibus, etc.).

The previous description of the disclosed embodiments are provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for monitoring a fluid flow, the system comprising:

- a conduit comprising a first section, a second section, and a third section wherein an impingement to the fluid flow is formed by a change in direction of inner and outer walls of the conduit from the first section to the second section, wherein the change in direction of inner and outer walls of the conduit from the first section to the second section is configured to redirect an entire flow of fluid from the first section to the second section and the second section comprises, at least, a direction that is perpendicular to the first section and the third section;
- a first sensor configured to sense a temperature of the fluid and provide a first temperature measurement;
- a second sensor thermally coupled to the conduit at the impingement, the impingement formed at an intersection of the first section and the second section, to provide a second temperature measurement, wherein the second sensor is located over the first section;
- a heater affixed to the conduit in thermal proximity to the second sensor to enable the heater to heat the second sensor; and
- a flow monitor configured to provide an indication of a flowrate of the fluid based on a temperature difference between the first temperature measurement and the second temperature measurement.

2. The system of claim 1, wherein the first sensor is thermally coupled to the conduit at a location that is thermally isolated from the heater to sense the temperature of the fluid.

3. The system of claim 1, wherein the impingement comprises a deformation in the conduit.

4. The system of claim 3 wherein the deformation of the conduit is not symmetric around an axis of the conduit.

5. The system of claim 1, wherein the change in direction is 90 degrees.

6. The system of claim 1 wherein the first sensor and the second sensor are selected from the group consisting of a resistive temperature detector, a thermocouple, and a thermistor.

7. The system of claim 1 wherein the heater is integrated with the second sensor in a heating-sensing device.

8. The system of claim 1 wherein the flow monitor comprises:

- a temperature difference calculator configured to provide a temperature difference measure that is indicative of the temperature difference between the first temperature measurement and the second temperature measurement;
- a calibration data datastore configured to store calibration data that relates the temperature difference measure to a flow rate; and
- a flow determination module configured to access the calibration data from the calibration datastore to obtain the flow rate and provide the indication of the flowrate.

9. A method for monitoring a fluid flow, the method comprising:

- conveying a fluid along a first section in a conduit to a second section of the conduit so that the fluid impinges upon an impingement formed by a change in direction of inner and outer walls of the conduit from the first section to the second section, and the change in direction of inner and outer walls of the conduit from the first section to the second section is configured to redirect an entire flow of fluid from the first section to the second section;

sensing a temperature with a sensor that is thermally coupled to the impingement to provide a heated temperature measurement, wherein the impingement is in a flow path of the fluid along the first section and the sensor is located over the first section;

heating the sensor with a heater;

sensing a temperature of the fluid at a location of the conduit that is thermally isolated from the heater to obtain a reference temperature measurement; and providing an indication of a flowrate of the fluid based on a temperature difference between the reference temperature measurement and the heated temperature measurement.

10. The method of claim 9 comprising:

producing, during a calibration mode, calibration data that relates temperature difference measures to flowrates, wherein each temperature difference measure is a difference between a reference temperature measurement and a heated temperature measurement;

obtaining, during operation, a temperature difference measure that is a temperature difference between the reference temperature measurement and the heated temperature measurement; and accessing, using the temperature difference measure, the calibration data to obtain a flow rate; and providing the indication of the flowrate of the fluid based upon the flow rate.

11. The method of claim 9, wherein providing the indication of a flowrate of the fluid comprises providing an alarm when the flowrate of the fluid drops below a threshold value.

12. A conduit for fluid flow comprising:

a first section, a second section, and a third section;

an impingement to the fluid flow formed by a change in direction of inner and outer walls of the conduit from the first section to the second section, wherein the change in direction of inner and outer walls of the conduit from the first section to the second section is configured to redirect an entire flow of fluid from the first section to the second section, and the second section comprises, at least, a direction that is perpendicular to the first section and the third section;

a first sensor configured to sense a temperature of the fluid and provide a first temperature measurement at a first end of the second section;

a second sensor in thermal proximity to the impingement to provide a second temperature measurement at a second end of the second section that is opposite to the first end of the second section, wherein the second sensor is located over the first section; and a heater affixed at the second end of the second section in thermal proximity to the second temperature sensor to enable the heater to heat the second sensor.

13. The conduit of claim 12, wherein the first sensor is thermally isolated from the heater to sense the temperature of a fluid.

14. The conduit of claim 12, wherein the impingement comprises a deformation in the conduit.

15. The conduit of claim 12, wherein the change in direction is 90 degrees.

* * * * *